(12) United States Patent
Wang (10) Patent No.: US 7,883,253 B2
(45) Date of Patent: Feb. 8, 2011

(54) BACKLIGHT MODULE

(75) Inventor: Tsun-I Wang, Taoyuan Hsien (TW)

(73) Assignee: Dynascan Technology Corp., Taoyuan Hsien (TW)

( * ) Notice: Subject to any disclaimer, the term of this patent is extended or adjusted under 35 U.S.C. 154(b) by 256 days.

(21) Appl. No.: 12/273,173

(22) Filed: Nov. 18, 2008

(65) Prior Publication Data

US 2009/0196017 A1 Aug. 6, 2009

(30) Foreign Application Priority Data

Feb. 5, 2008 (TW) .............................. 97104734 A (51) Int. Cl.
*F21V 7/04* (2006.01)
(52) U.S. Cl. .................. 362/613; 362/555; 362/615; 362/617
(58) Field of Classification Search ................ 362/555, 362/612–613, 615, 617–620
See application file for complete search history.

(56) References Cited

U.S. PATENT DOCUMENTS

2004/0125591 A1* 7/2004 Leu et al. ...................... 362/31
2006/0007704 A1* 1/2006 Mori et al. .................. 362/613
2008/0084709 A1* 4/2008 Li et al. ....................... 362/616

* cited by examiner

*Primary Examiner*—Sandra L O Shea
*Assistant Examiner*—Meghan K Dunwiddie
(74) *Attorney, Agent, or Firm*—Birch, Stewart, Kolasch & Birch, LLP (57) ABSTRACT

A backlight module comprises at least a light-guide plate, a palette device and an LED bar. The palette device comprises a palette and light-guide bar and at least one palette LED. The palette and light-guide bar is disposed at a side end of the light-guide plate and has a light-input surface, a light-output surface corresponding to the light-input surface, a first side, a second side corresponding to the first side, a top, and a bottom corresponding to the top. The palette LED is adjacent to the first side and provides a palette light into the palette and light-guide bar. The LED bar is adjacent to the light-input surface of the palette and light-guide bar. The LED bar emits an incident light, which is through the light-input surface into the palette and light-guide bar, wherein a light mixed by the incident light and the palette light is output through the light-output surface is and the side end into the light-guide plate so as to be a light source of the backlight module.

16 Claims, 5 Drawing Sheets

BACKLIGHT MODULE

BACKGROUND OF THE INVENTION

1. Field of the Invention

The present invention generally relates to a backlight module, more particularly to a backlight module having a palette device.

2. Description of the Prior Art

A general display with the feature of autoluminescence as an LCD may need a backlight source for displaying images. For several prior backlight technologies, the backlight module with the feature of inputting light from a side end thereof may be more demanded to the needs of slim product. Such technologies are being widely applied to the screen of a laptop computer and an LCD.

Figure 1:
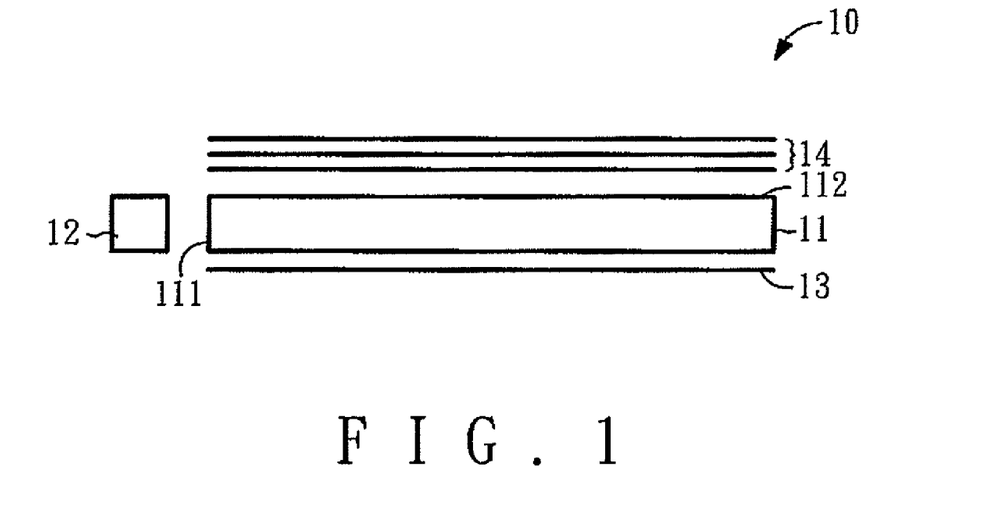
FIG. 1 illustrates a schematic view of a prior backlight module.
Figure 2:
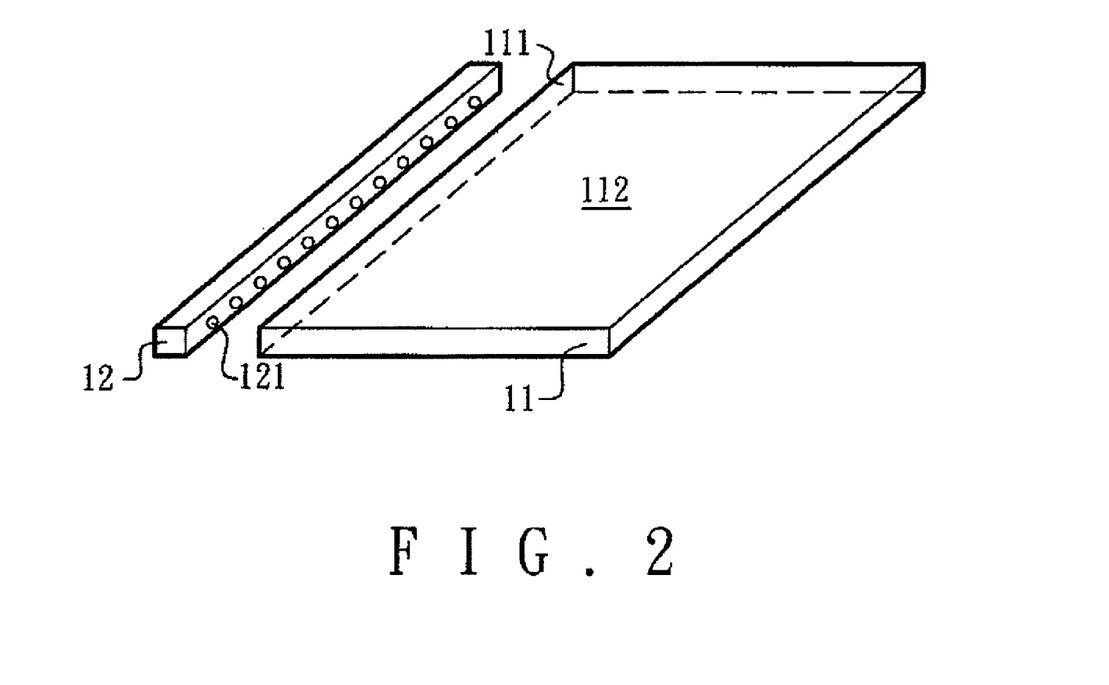
FIG. 2 illustrates a schematic view of a light-guide plate and an LED bar of the prior backlight module.

With references to FIG. 1 and FIG. 2, which illustrates a schematic view of a prior backlight module and a schematic view of a light-guide plate and an LED bar of the prior backlight module. As shown in the figures, a backlight module 10 includes a light-guide plate 11, an LED bar 12, a reflector 13, and a plurality of optical films 14. The light-guide plate 11 has a side end 111 and an emergent surface 112. The LED bar 12 is disposed at the side end 111 of the light-guide plate 11. The plurality of optical films 14 are disposed on the emergent surface 112 of the light-guide plate 11. The reflector 13 is disposed on the bottom of the light-guide plate 11, wherein the bottom is corresponding to the emergent surface 112.

A plurality of white light LEDs 121 are disposed at the LED bar 12 and corresponding to the side end 111 of the light-guide plate 11 in order to emit a linear light. The linear light from the LED bar 12 passes through the side end 111 of the light-guide plate 11 and then into the light-guide plate 11. The incident linear light from the LED bar 12 is totally reflected within the light-guide plate 11 due to a total reflection interface in the light-guide plate 11. Continuously, the light is output from the emergent surface 112 and passes through the plurality of optical films 14 to an LCD not shown in the figures.

The area of the emergent surface 112 is almost the same as the display, that is, the backlight module 10 is able to provide a uniform area light to the display.

Further, the plurality of optical films 14 have at least one brightness enhancement film and at least one diffuser in order to strengthen the light quality provided by the backlight module. The reflector 13 below the light-guide plate 11 is to avoid the incident light emitting downwardly and promote the usage rate of light.

As aforesaid, the LED bar 12 emits white light by means of the white LEDs 121. Generally speaking, the white LED 121 emits a white light by way of a blue LED motivating yellow florescence, that is, a florescent white light LED. The color of the white light LED is closer to the blue color tone and short of red color tone. Thus, the color of the LCD is a little bit ashy.

Other factors as the changeable wavelengths of the blue light LED, the changeable contents of the florescence and the differences between the thicknesses of the light-guide plates are the key roles to cause the white light closer to the blue color tone. In another word, the differences between different color tones make error distributions in color coordinates (x, y). Hence, QC is hardly made.

A distribution range of the white light LED in color coordinates (x, y) is around 0.28 to 0.32. If under the condition of 6500K (D65) of a color temperature, the color coordinates is (0.31, 0.32). The variety ($\Delta x$, $\Delta y$) must be controlled within 0.005 so as to control the color coordinates in a better range.

Presently the distribution range is very broad, and applicative LEDs must be filtered by way of color bin sorting. The only consideration is that the sorted categories may be hundreds so as to cause the problems of overstock, oversorting and labor cost. Besides, the color coordinates of some light from some LEDs are too small so as to cause a condition of hard usage and that the color tone is closer to ashy, and then a defect rate is highly increased.

As a conclusion, how to make the color tone of a backlight module agree with the needs of a display in order to represent the true colors of images will be the first priority to the persons skilled in the art.

SUMMARY OF THE INVENTION

The primary objective of the present invention is to provide a backlight module with a palette device. By means of the palette device, the light source of the backlight module can be adjusted in order to produce the light with uniform color tone.

The backlight module at least comprises a light-guide plate, a palette device and an LED bar.

The light-guide plate has a side end, which is a light incident end. The palette device has a palette and light-guide bar and at least one palette LED. The palette and light-guide bar is a hexahedral member and has a light-input surface, a light-output surface corresponding to the light-input surface, a first side, a second side corresponding to the first side, a top, and a bottom corresponding to the top. The palette and light-guide bar is disposed at the outside of the side end of the light-guide plate, and the light-output surface is connected to the side end of the light-guide plate.

The palette LED is adjacent to the first side and providing a palette light, which passes through the first side into the palette and light-guide bar.

It is to be noted that the light-output surface of the palette and light-guide bar has a plurality of micro scatter structures, and the palette light from the palette LED passes through the micro scatter structures so as to form a uniform linear light source.

The LED bar is adjacent to the light-input surface of the palette and light-guide bar and has a plurality of LEDs. The LED bar emits an incident light, which is through the light-input surface into the palette and light-guide bar, wherein a light mixed by the incident light and the palette light is output through the light-output surface and the side end into the light-guide plate.

Preferably, the LED bar is a white light LED bar. The palette LED can only be disposed adjacent to the first side, or both ends of the palette and light-guide bar, that is, around the first side and the second side. Further, the number of the LEDs is demanded by different color tones.

Other and further features, advantages, and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits, and advantages of the preferred embodiments of the present invention will be readily understood by the accompanying drawings and detailed descriptions, wherein.

DETAILED DESCRIPTION OF THE INVENTION

Figure 3A:
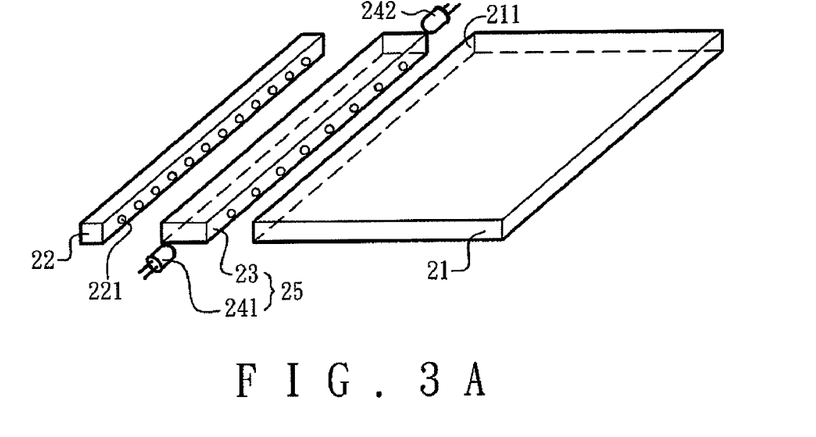
FIG. 3A illustrates a schematic view of a backlight module of the present invention.
Figure 3B:
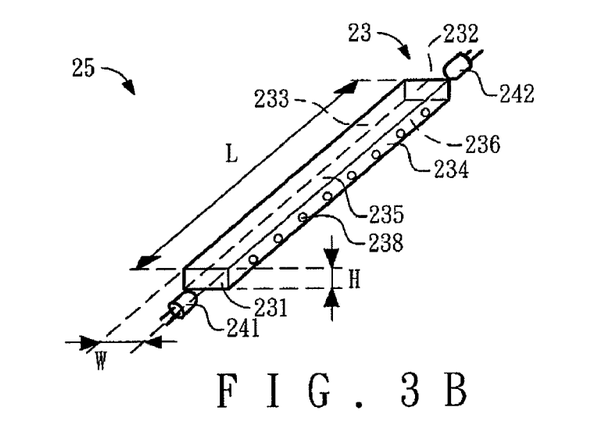
FIG. 3B illustrates a schematic view of a palette device of the backlight module of the present invention.

With references to FIG. 3A and FIG. 3B, which illustrate a schematic view of the backlight module of the present invention and a schematic view of a palette device of the backlight module of the present invention.

As shown in the figures, the backlight module adopts a side end thereof to be a role for inputting light. The backlight module includes a light-guide plate 21, a palette device 25 and an LED bar 22.

The light-guide plate 21 has a side end 211, which is a light incident end. The palette device 25 has a palette and light-guide bar 23 and a palette LED 241.

The palette and light-guide bar 23 is at least a hexahedral member, but can be a heptahedron, an octahedron or a polyhedron with more than eight surfaces as well. Preferably, the palette and light-guide bar 23 is a hexahedral member and has a light-input surface 233, a light-output surface 234 corresponding to the light-input surface 233, a first side 231, a second side 232 corresponding to the first side 231, a top 235, and a bottom 236 corresponding to the top 235. The palette and light-guide bar 23 is disposed at the outside of the side end 211 of the light-guide plate 21, and the light-output surface 234 is connected to the side end 211 of the light-guide plate 21.

Preferably, the palette and light-guide bar 23 is made of transparent plastic material, such as PC or PMMA. The first side 231, the second side 232, the top 235, the bottom 236, and the light-input surface 233 are all slickensides.

The first palette LED 241 is adjacent to the first side 231 and provides a palette light, which passes through the first side 231 into the palette and light-guide bar 23.

Preferably, the palette device 25 further includes a second palette LED 242 adjacent to the second side 232, the second palette LED 242 provides a palette light which passes through the second side 232 into the palette and light-guide bar 23.

In other words, the palette LED can only be disposed adjacent to the first side 231, or both ends of the palette and light-guide bar 23, that is, around the first side 231 and the second side 232. Further, for other preferred embodiments, the number of the first palette LEDs 241 or the second palette LEDs 242 is demanded by different color tones.

Besides, the first palette LEDs 241 or the second palette LEDs 242 may comprises red light LEDs, green light LEDs, blue light LEDs, all-in-one LEDs, or multi-assembly LEDs.

Please refer to FIG. 3A and FIG. 3B again, the light-output surface 234 of the palette and light-guide bar 23 has a plurality of micro scatter structures 238, and the palette light from the first palette LED 241 or the second palette LED 242 passes through the micro scatter structures 238 so as to form a uniform linear light source. Preferably, the micro scatter structure 238 can be a protrusion structure, which is hemisphere, cone, cuboid, or other micro structures; on the other hand, the micro scatter structure 238 can be a concave structure, which is hemisphere, cone, cuboid, or other micro structures.

The LED bar 22 is adjacent to the light-input surface 233 of the palette and light-guide bar 23 and has a plurality of LEDs 221. The LED bar 22 emits an incident light, which is through the light-input surface 233 into the palette and light-guide bar 23, and the incident light is then output from the light-output surface 234. Wherein a light mixed by the incident light from the LED bar 22 and the palette light from the first palette LEDs 241 or the second palette LEDs 242 is output through the side end 211 into the light-guide plate 21.

For the preferred embodiment, the LED bar 22 has the plurality of white light LEDs 221, and the light from the light-guide plate 21 is mixed by the white light LEDs 221, the first palette LEDs 241 and the second palette LEDs 242. So the color tone of the mixed light may not be closer to the color tone of ashy, and represent proper color tone.

Preferably, for more effective usage to the light in the palette and light-guide bar 23, the top 235 and the bottom 236 may have a total reflection layer respectively in order to avoid the leakage of light. The light-output surface 234 of the palette and light-guide plate 23 is connected to the side end 211 of the light-guide plate 21 so as to effectively transmit the light in the palette and light-guide plate 23 into the light-guide plate 21 by means of the light-output surface 234.

Preferably, for the dimensions of the palette and light-guide bar 23, the distance between the first side 231 and the second side 232, that is the length L of the palette and light-guide bar 23, is equal to the length of the light-guide plate 21 practically. The distance between the top 235 and the bottom 236, that is, the thickness H of the palette and light-guide bar 23, is equal to the thickness of the light-guide plate 21 practically. So that the incident light from the LED bar 22 and the palette lights from the palette LEDs 241 and 242 are effectively transmitted into the light-guide plate 21. The distance between the light-input surface 233 and the light-output surface 234, that is, the width w of the palette and light-guide bar 23, is determined upon the palette demands including the dimensions and the numbers of LED.

Figure 4:
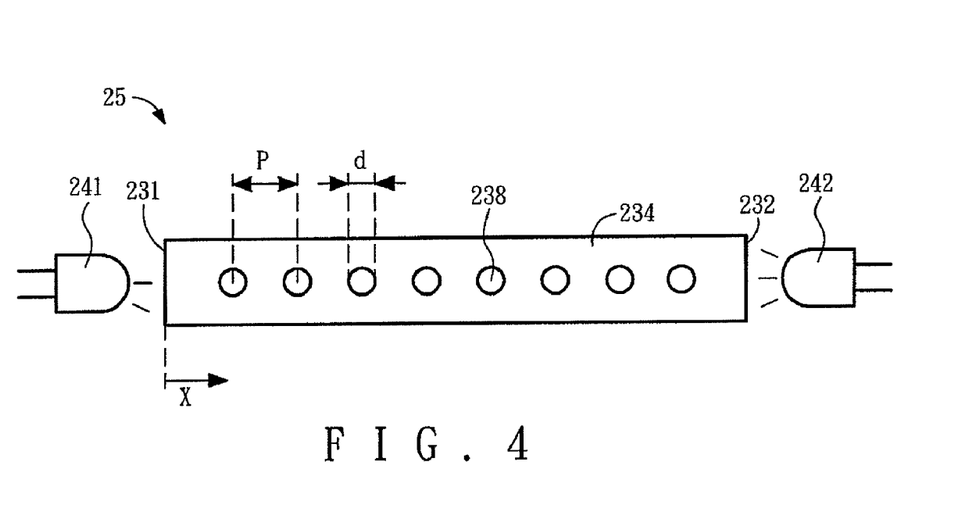
FIG. 4 illustrates a front view of the palette device of the present invention.

With reference to FIG. 4, which illustrates a front view of the palette device 25 of the present invention. The palette lights from the first palette LED 241 and the second palette LED 242 are transmitted into the palette and light-guide bar 23 via the first side 231 and the second side 232 respectively, continuously the lights are output through the micro scatter structures 238. For a uniform linear light source produced by the palette and light-guide bar 23, the dimensions and the pitches of the micro scatter structures are the most important factors while in design.

With reference to FIG. 3B and FIG. 4, the light illumination of the first palette LED 241 is assumed as I0, the area of the first side 231 is A0. The micro scatter structure 238 is a concavity structure with the shape of hemisphere and has a diameter d. The pitch of two micro scatter structures is p. The light illumination of a light emitted from a location x is $$\frac{dI(x)}{dx} = \alpha I(x),$$

wherein α is a scatter coefficient, which is related to the diameter d and pitch p of the micro scatter structures and described as the following equation:

$$\alpha \cong d^2/A_0 \cdot p \quad (1),$$

$$\text{since } dI(x) = -\alpha I(x)dx \quad (2),$$

$$\text{then } I(x) = I_0 e^{-\alpha x} \quad (3).$$

From equation (3), assuming that the scatter coefficient α is a constant, the light illumination is inversely proportional to x. For instance, assuming that L=300 mm, H=1 mm, W=5 mm, p=1 mm, and α=1/150, then $I(x=L)/I_0 = e^{-(300/150)} = 0.13$. In another word, the light from the first palette LED 241 is transmitted from the location of x=0 mm to x=300 mm, the residue of the light is only 13.5%. Which means the light illumination is decreased by the increase of x.

On the other hand, equation (4) as:

$$\alpha = d^2/A_0 \cdot p = d^2/W \cdot H \cdot p = 1/150,$$

the diameter d≅0.18 mm.

Equation (5) as $d^2/H \cdot p$=the area of the micro scatter structures 238/the area of the light-output surface 234 shall determine a ration of 5/150=1/30. That is, while the light from the LED bar 22 passing through the light-input surface 233 is being output through the light-output surface 234, 3.3% of the light will be refracted by the micro scatter structures 238. And a half of 3.3% (around 1.6%) will be again refracted to the light-input surface 233 and the LED bar 22 so as to cause some loss, which is very tiny and can be ignored.

From equation (3), the palette light is scattered through the light-output surface 234 is an exponential decrease.

Figure 5:
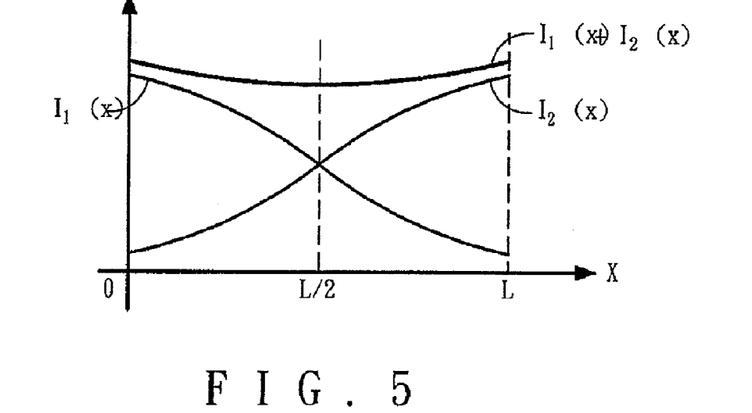
FIG. 5 illustrates a schematic view of the light illumination of a palette and light-guide bar of the palette device of the present invention.

As shown in FIG. 4, if α=1/150, and the first palette LED 241 and the second LED 242, which have the same illumination, are disposed at the first side 231 and the second side 232 respectively, the combined light illumination is represented as $I_T(x) = I_1(x) + I_2(x)$ and can be seen in FIG. 5. Due to $I_1(x=L/2)/I_0 = 0.37$ and $I_1(x=L)/I_0 = I_2(0) = 0.13$, the combined light illumination is as:

$$I_T(0) = I_1(0) + I_2(0) = 1.13, \text{ and } I_T(L/2) = I_1(L/2) + I_2(L/2) = 0.74.$$

Due to aforesaid equations and FIG. 5, the light illumination at L/2, which is the middle of the palette and light-guide bar 23, is 65% of the light illumination of the two ends, therefore the output light is not uniform.

To improve the problem of uneven scattered light can depend on the development of equation (2). To make a uniform scattered palette light, dI(x)/dx must be a constant in equation of dI(x)/dx=−αI(x). That is, $$dI(x)/dx = -\alpha I(x) = -CI_0 \quad (6),$$

wherein constant C is an expected scatter rate. From equation (6), two following equations as below:

$$I(x) = I_0(1 - Cx) \quad (7)$$

$$\alpha(x) = C/(1 - Cx) \quad (8)$$

As shown in equation (8), the scatter coefficient α(x) is not a constant and increased with x.

As an example, if L=300 mm, H=1 mm, W=5 mm, and p=1 mm, only the first palette LED 241 is disposed around the first side 231, that is, only one palette light at one end is provided to pass through the first side 231 and into the palette and light-guide bar 23, and $I(x=L) = 0.13 I_0$, which means 13% of palette light are not scattered. Therefore, C=0.0029 mm$^{-1}$ from equation (7), and from equation (8), an equation is gained as:

$$\alpha(x) = 0.0029/(1 - 0.0029x) \quad (9),$$

and substituted in equation (1), then it is shown as:

$\alpha \cong d^2/A_0 \cdot p = 0.0029/(1 - 0.0029x)$, so the variation of the diameter of the micro scatter structure 238 is represented as:

$$d(x) = [0.0029/(1 - 0.0029x) \cdot 5 \times 1]^{1/2} \text{ mm} \quad (10),$$

while x=0, d(0)=0.12 mm; x=L/2, d(L/2)=0.16 mm; and x=L, d(L)=0.33 mm.

With references to aforesaid, only the first palette LED 241 is disposed around the first side 231 and only one palette light at one end is provided to pass through the first side 231 and into the palette and light-guide bar 23, the diameter/dimensions of the micro scatter structures 238 are variable based on equation (10) so as to have a uniform output light source.

Figure 6A:
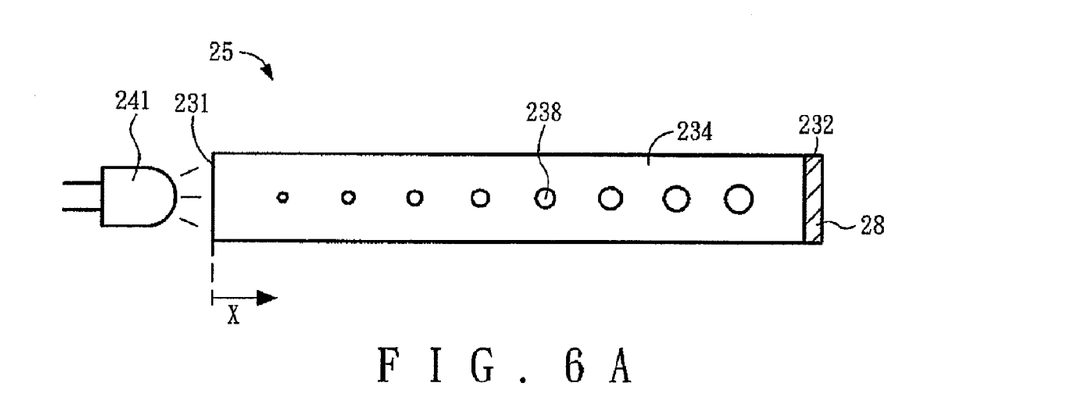
FIG. 6A illustrates a schematic view of only one end providing a palette light of the first preferred embodiment of the present invention.

Referring to FIG. 6A, which illustrates a schematic view of only one end providing a palette light of the first preferred embodiment of the present invention. As shown in the figure, only the first palette LED 241 is disposed around the first side 231, and therefore only one palette light at one end is provided to pass through the first side 231 and into the palette and light-guide bar 23. Continuously the palette light is scattered through the micro scatter structures 238 of the light-output surface 234. Wherein the diameter/dimensions of the micro scatter structures 238 are being larger while such micro scatter structures 238 are farther from the first side 231. For the preferred embodiment, the second side 232 of the palette and light-guide bar 23 can be a total reflection layer 28 so as to completely use the palette light. In other words, every palette light can be output via the micro scatter structure 238.

Figure 6B:
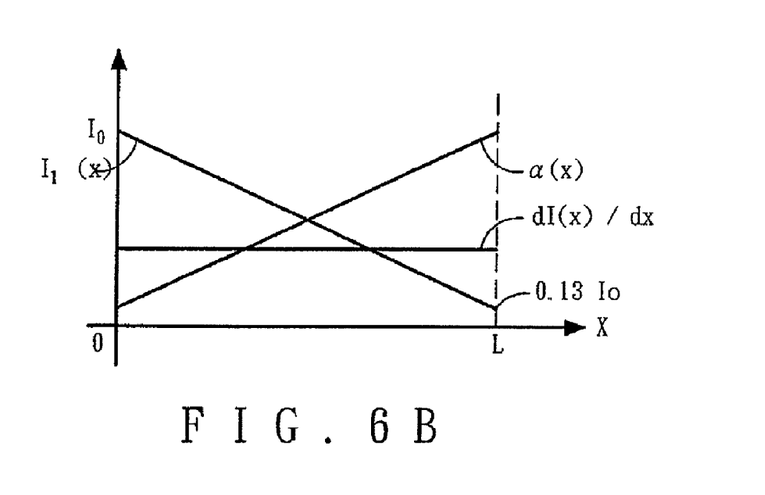
FIG. 6B illustrates a schematic view of the light illumination of only one light entering into the one end of the palette and light-guide bar of the present invention.

With reference to FIG. 6B, which illustrates a schematic view of the light illumination of only one light entering into the one end of the palette and light-guide bar of the present invention. The light illumination I(x) is decreased with the increase of x. But for the preferred embodiment, the scatter coefficient α(x) is not constant, and it is increased with the increase of x. That is, the dimensions of the micro scatter structure 238 are increased with the increase of x. Therefore, the light illumination of the palette light, dI(x)/dx ∝ α(x)I(x), may not be increased with the increase of x. Hence, the palette and light-guide bar 23 of the preferred embodiment can produce a uniform linear light source.

Figure 7A:
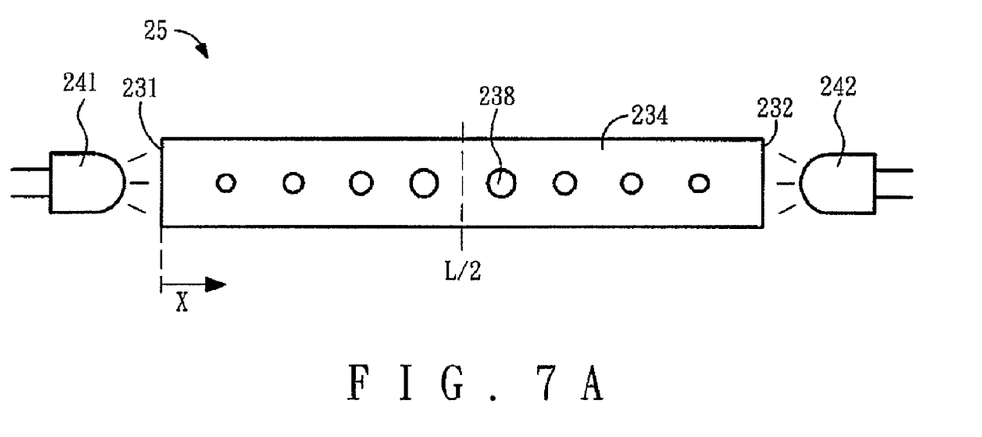
FIG. 7A illustrates a schematic view of two ends providing two palette lights of the second preferred embodiment of the present invention.

For the second preferred embodiment, if L=300 mm, H=1 mm, W=5 mm, and p=1 mm, the first palette LED 241 and the second palette LED 242 are disposed around the first side 231 and the second side 232 respectively, and the palette lights from the outside of the two ends pass through the first side 231 and the second side 232 and then into the palette and light-guide bar 23. Meanwhile, the scattered light output from the palette and light-guide bar 23 is the combination of the light illumination $I_1$ and light illumination $I_2$. Wherein the light illuminations of the first palette LED 241 and the second palette LED 242 are assumed to be the same as the color tone.

The difference between the first preferred embodiment and the second preferred embodiment is that of the second preferred embodiment adopting two palette lights provided from the outside of the two ends of the palette and light-guide bar 23. So that, d must be varied with the location at L/2 of the palette and light-guide bar 23 symmetrically. That is, for equation (10), the scope of variation of x is from 0 to L/2; especially, the structure must be designed symmetrically while $x \geq L/2$.

With reference to FIG. 7A, which illustrates a schematic view of two ends providing two palette lights of the second preferred embodiment of the present invention. As shown in the figure, the first palette LED 241 and the second palette LED 242 are disposed around the first side 231 and the second side 232 respectively, and the lights from the outside of the two ends pass through the first side 231 and the second side 232 and then into the palette and light-guide bar 23. Then the palette lights are scattered through the micro scatter structures 238 of the light-input surface 234. Wherein the dimensions/diameters d of the micro scatter structures 238 are being symmetrically increased from both the first side 231 and the second side 232 to the middle, where is L/2.

Figure 7B:
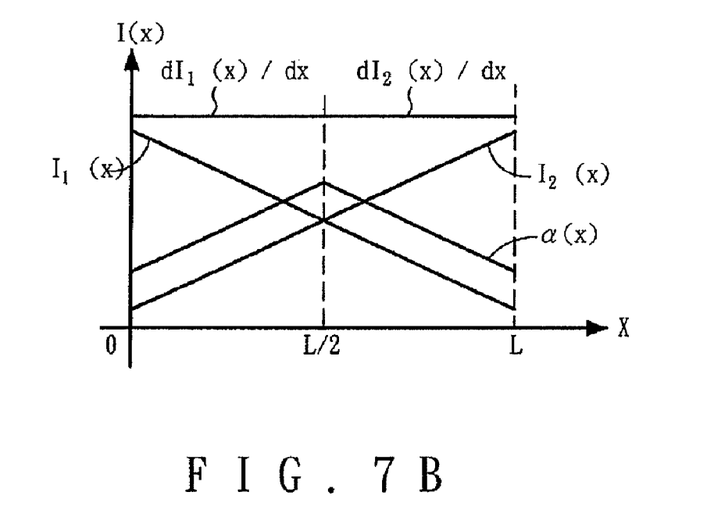
FIG. 7B illustrates a schematic view of the light illumination of two lights entering into the two ends of the palette and light-guide bar of the present invention.

With reference to FIG. 7B, which illustrates a schematic view of the light illumination of two lights entering into the two ends of the palette and light-guide bar of the present invention. As shown in the figure, the combined illumination of the whole scattered light is represented as $dI_1(x)/dx + dI_2(x)/dx$. As it can be seen, the 5 combined illumination may not be changed with x almost. Hence, the palette and light-guide bar 23 can definitely produce a uniform linear light source.

With the comparison of FIG. 6A and FIG. 7A, the area ratio of the micro scatter structures 238 and the light-output surface 234 of FIG. 6A is larger than the area ratio of the micro scatter structures 238 and the light-output surface 234 of FIG. 7A. Hence, the incident light of the LED bar 22 in the preferred embodiment of FIG. 7A is lost less than the preferred embodiment of FIG. 6A.

There is another way to make the scattered light be uniform, that is, to adjust the pitch p among the micro scatter structures 238. From equation (11) as $\alpha(x) = d^2/A_0 \cdot p = C/(1-Cx)$, another equation (12) as $p = (d^2/A \cdot C) \cdot (1-Cx)$ is gained. For instance, if L=300 mm, H=1 mm, W=5 mm, d=0.12 mm, and C=0.0029, and only the first palette LED 241 is disposed around the first side 231, hence only one light goes through the first side 231 and enters into the palette and light-guide bar 23. From equation (12), the first result is that p=1.0 mm while x=0; the second result is that p=0.56 mm while x=L/2.

With references to aforesaid, only the first palette LED 241 is disposed around the first side 231 and only one palette light at one end is provided to pass through the first side 231 and into the palette and light-guide bar 23, the pitches of the micro scatter structures 238 are variable based on equation (12) so as to have a uniform output light source.

Figure 8A:
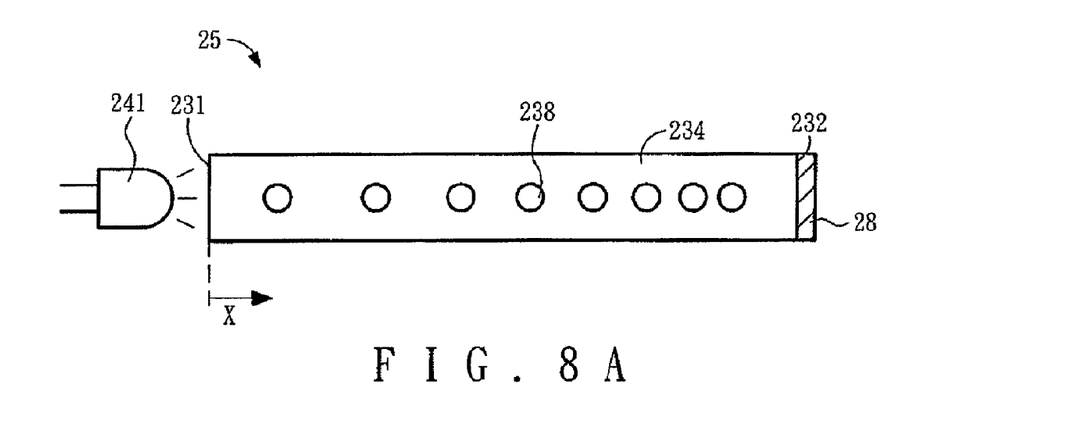
FIG. 8A illustrates a schematic view of only one end providing a palette light of the third preferred embodiment of the present invention.

Referring to FIG. 8A, which illustrates a schematic view of 5 only one end providing a palette light of the third preferred embodiment of the present invention. As shown in the figure, only the first palette LED 241 is disposed around the first side 231, and therefore only one palette light at one end is provided to pass through the first side 231 and into the palette and light-guide bar 23. 1o Continuously the palette light is scattered through the micro scatter structures 238 of the light-output surface 234. Wherein the pitches of the micro scatter structures 238 are being smaller while such micro scatter structures 238 are farther from the first side 231. In another word, the micro scatter structures 238 are closer while the is micro scatter structures 238 is being close to the second side 232, that is, x=L. Thus, the third preferred embodiment does produce a uniform linear light source.

For the preferred embodiment, the second side 232 of the palette and light-guide bar 23 can be a total reflection layer 28 20 so as to completely use the palette light. In other words, every palette light can be output via the micro scatter structure 238.

Figure 8B:
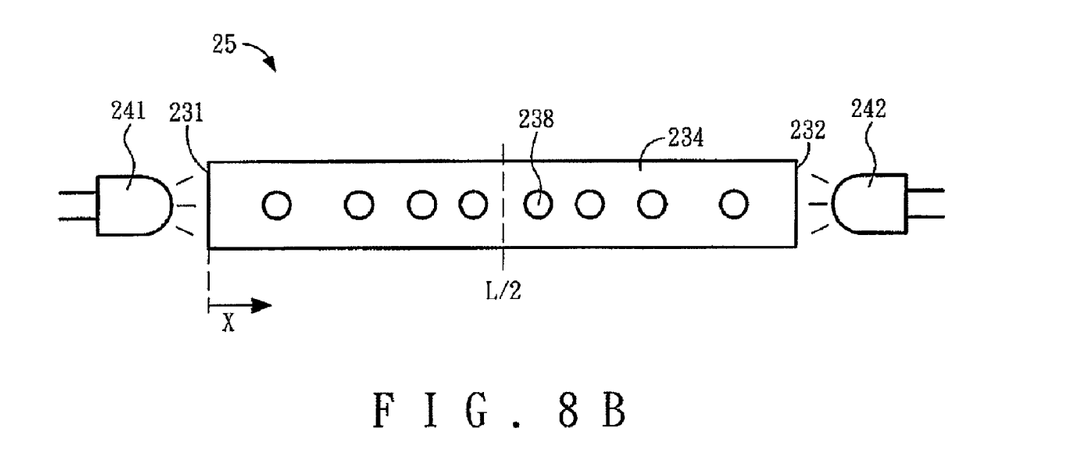
FIG. 8B illustrates a schematic view of two ends providing two palette lights of the fourth preferred embodiment of the present invention.

For the fourth preferred embodiment, the first palette LED 241 and the second palette LED 242 are disposed around the first side 231 and the second side 232 respectively, and the palette 25 lights from the outside of the two ends pass through the first side 231 and the second side 232 and then into the palette and light-guide bar 23. P must be varied with the location at L/2 of the palette and light-guide bar 23 symmetrically. That is, for equation (12), the scope of variation of x is from 0 to L/2; especially, the structure must be designed symmetrically while $x \geq L/2$. the combined illumination of the whole scattered light is represented as $dI_1(x)/dx + dI_2(x)/dx$. As it can be seen, the combined illumination may not be changed with x almost. Hence, the palette and light-guide bar 23 can definitely produce a uniform linear light source.

With reference to FIG. 8B, which illustrates a schematic view of two ends providing two palette lights of the fourth preferred embodiment of the present invention. As shown in the figure, the first palette LED 241 and the second palette LED 242 are disposed around the first side 231 and the second side 232 respectively, and the lights from the outside of the two ends pass through the first side 231 and the second side 232 and then into the palette and light-guide bar 23. Then the palette lights are scattered through the micro scatter structures 238 of the light-input surface 234. Wherein the pitches d of the micro scatter structures 238 are being symmetrically decreased from both the first side 231 and the second side 232 to the middle, where is L/2. In another word, the micro scatter structures 238 are closer while the micro scatter structures 238 is being close to the middle, that is, x=L/2. Thus, the fourth preferred embodiment does produce a uniform linear light source.

For the backlight module of the present invention, the backlight source is formed as that of the mixed light by the incident light from the LED bar 22 and the light from the first palette LED 241 or the second palette LED 242 passing through the side end 211 of the light-guide plate 21 and then entering into the light-guide plate 21. It is to be noted, the luminous flux may not be too much during the palette process, even only one or several LEDs will be enough.

Taking a 12-inch backlight module as an example, the white light LED bar has 60 LEDs. The luminous flux of each white light LED is 5 lumens, and the average coordinates are (0.3, 0.3). If using a set of red light LEDs, which luminous flux is 20 lumens and coordinates are (0.7, 0.7), the estimation is as follows:

$$x = X/(X+Y+Z), y = Y/(X+Y+Z) \qquad (13),$$

wherein x, y and z are tri-stimulus values from CIE1931. Thus, the total stimulus value of the whole white light LED bar is:

$$X+Y+Z = Y/y = 60 \times 5/0.3 = 1000 \text{ lumens}.$$

If adding more red light LEDs, the values of $\Delta x$ and $\Delta y$. And $\Delta X = x/y(\Delta Y)$, thus $\Delta X = 0.7/0.3 \times 20 = 46$ if $\Delta Y$ of the added red light LEDs is 20 lumens.

The coordinates can be determined by equation (13), and they are shown as:

$\Delta x \cong \Delta X/(X+Y+Z) = 46/1000 = 0.046$, and $\Delta y \cong \Delta Y/(X+Y+Z) = 20/1000 = 0.02$.

Thus, the color coordinates of the backlight module are (0.346, 0.32) after the palette process.

According to above analysis, only adding a set of red light LEDs with 20 lumens, the color coordinates ($\Delta x$, $\Delta y$) can be adjusted to (+0.046, +0.02). Further, adding a set of red light LEDs with 40 lumens, the color coordinates ($\Delta x$, $\Delta y$) can be adjusted to (+0.012, +0.04).

Nowadays, high-illumination LEDs are popular already. For the field of high efficiency, the red light LED can reach 100 lumens/watt, and the green light LED can reach above 120 lumens/watt. The luminous flux of a low power red light LED approaches 5 lumens, and the luminous flux of a low power red light LED approaches beyond 8 lumens.

Thus, only four low power red light LEDs can reach the palette scope of $\Delta x \approx 0.034$, and five low power red light LEDs can reach the palette scope of $\Delta y \approx 0.04$.

According to above analysis, adding red light LED may add X stimulus value of the tri-stimulus values. The wavelength of red light LED just matches with the high receiving wavelength of the red filter of the color filters of LCD, therefore the added red light can be almost output by the color filters.

Due to that the most wavelength of white light is absorbed while in the process of wavelength allocation and in the receiving area of the red color of the color filters, the tone of output white light is closer to ashy so as to represent the color tone of skin abnormally. Hence, adding some red light may highly improve the color tone of skin.

If using the palette device to adjust the color coordinates of the backlight module, the adjustment can be done from $\Delta x$ or $\Delta y$ to positive or from $\Delta x$ or $\Delta y$ to negative. As aforesaid, adding red light LED may adjust $\Delta x$ toward positive; adding green light LED may adjust $\Delta y$ toward positive as well. On the other hand, to adjust the color coordinates toward negative, adding blue light LED is a must.

Generally speaking, the color coordinates of blue light LED are (0.15, 0.05). If the total luminous flux is 8 lumens, then $\Delta Z=(1-x-y)/y \times \Delta Y$, wherein $\Delta Y$ is equal to the total luminous flux, which is 8 lumens. Then $\Delta Z=(1-0.15-0.05)/0.05 \times 8 = 128$ lumens.

Since $\Delta X$ and $\Delta Y$ of the tri-stimulus values of blue light LED are tiny, thus only $\Delta Z$ should be considered. Continuously, the color coordinates of adding blue light LED can be gained by below equation:

$$x^1 = \frac{X}{X+Y+Z+\Delta Z}$$
$$= \frac{X}{X+Y+Z} \cdot \frac{1}{\left(1 + \frac{\Delta Z}{X+Y+Z}\right)}$$
$$\cong x\left(1 - \frac{\Delta Z}{X+Y+Z}\right),$$

Hence, the variation of the color coordinates of x is as:

$$\Delta x = x^1 - x = -x \cdot \frac{\Delta Z}{X+Y+Z}$$

$$\Delta y = -y \cdot \frac{\Delta Z}{X+Y+Z}$$

Then, $\Delta x = -0.15 \times (128/1000) = -0.02$, and $\Delta y = -0.05 \times (128/1000) = -0.004$. The purpose of lowering the color coordinates is approached. Consequently, adding some palette LEDs, which is red, green or blue, to the first side 231 and the second side 232 at the two ends of the palette and light-guide bar 23 and the white light LED bar 22 being disposed at the light-input surface 233 of the palette and light-guide bar 23, aforesaid purpose is approached.

The incident light of the white light LED bar 22 is input from the light-input surface 233 and output from the light-output surface 234. The palette light from the palette LEDs is input from the first side and/or the second side and output from the micro scatter structure 238. Meanwhile, the output light from the light-input surface 233 of the palette and light-guide bar 23 is mixed by the incident light and the palette light and shaped as a uniform linear light source, which is offered to the light-guide plate 21 of the backlight module.

In practice, by means of some light-test and color-test devices to measure and adjust the pulse width of the PWM (pulse width modulation) for precisely controlling the light illumination, the actual color coordinates can then be reached. Further, the demand of highly uniformity within 0.005 of ($\Delta x$, $\Delta y$) is gained.

As a conclusion, the advantages of the present invention are listed below.
1. By means of the palette device, the backlight source of the backlight module is adjustable in order to produce uniform color tone.
2. The light source provided by the backlight module of the present invention can be in the process of palette. So that the color tone of LCD may not be closer to ashy color and be represented properly.
3. The palette LED/LEDs of the palette device are disposed at the one end or two ends of the palette and light-guide bar; further, the dimensions, positions or distribution density of the micro scatter structures of the light-output surface are adjustable. Thus, both features make a uniform linear light source.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A backlight module comprising:
    a light-guide plate having a side end;
    a palette device comprising:
        a palette and light-guide bar, which is at least a hexahedral member and has a light-input surface, a light-output surface corresponding to the light-input surface, a first side, a second side corresponding to the first side, a top, and a bottom corresponding to the top, the palette and light-guide bar being disposed at the outside of the side end of the light-guide plate, and the light-output surface being connected to the side end of the light-guide plate, wherein the light-output surface has a plurality of micro scatter structures; and at least one first palette LED being adjacent to the first side and providing a palette light, which passes through the first side into the palette and light-guide bar; and an LED bar being adjacent to the light-input surface of the palette and light-guide bar and having a plurality of LEDs, the LED bar emitting an incident light, which is through the light-input surface into the palette and light-guide bar, wherein a light mixed by the incident light and the palette light is output through the light-output surface and the side end into the light-guide plate.

2. The backlight module according to claim 1, wherein the micro scatter structure is selected from the protrusion structure group of hemisphere, cone and cuboid.

3. The backlight module according to claim 1, wherein the micro scatter structure is selected from the concave structure group of hemisphere, cone and cuboid.

4. The backlight module according to claim 1, wherein the dimensions of the micro scatter structures are gradually larger while the distance between the micro scatter structures and the first side is gradually larger.

5. The backlight module according to claim 1, wherein the palette device further comprises a second palette LED adjacent to the second side, the second palette LED provides a palette light which passes through the second side into the palette and light-guide bar, the dimensions of the micro scatter structures are being larger from the first side and the second side of the two ends of the palette and light-guide bar to the middle portion thereof.

6. The backlight module according to claim 1, wherein each pitch of the micro scatter structures is gradually smaller while the distance between the micro scatter structures and the first side is gradually larger.

7. The backlight module according to claim 1, wherein the palette device further comprises a second palette LED adjacent to the second side, the second palette LED provides a palette light which passes through the second side into the palette and light-guide bar, the pitches of the micro scatter structures are being smaller from the first side and the second side of the two ends of the palette and light-guide bar to the middle portion thereof.

8. The backlight module according to claim 1, wherein a total reflection layer is on the second side.

9. The backlight module according to claim 1, wherein the palette device further comprises a second palette LED adjacent to the second side, the second palette LED provides a palette light which passes through the second side into the palette and light-guide bar.

10. The backlight module according to claim 1, wherein two reflection layers are on the top and the bottom respectively.

11. The backlight module according to claim 1, wherein the palette and light-guide bar is made of transparent plastic material.

12. The backlight module according to claim 1, wherein the LED bar is consisted of white LEDs.

13. The backlight module according to claim 1, wherein the first palette LED is selected from the group of red light LED, green light LED, blue light LED, and multi-color LED.

14. The backlight module according to claim 10, wherein the second palette LED is selected from the group of red light LED, green light LED, blue light LED, and multi-color LED.

15. The backlight module according to claim 1, wherein the distance between the first side and the second side is equal to the length of the light-guide plate, the distance between the top and the bottom is equal to the thickness of the light-guide plate.

16. The backlight module according to claim 1, wherein the first side, the second side, the top, the bottom, and the light-input surface are all slickensides.

* * * * *